United States Patent [19]

Arzenti et al.

[11] Patent Number: 4,714,289
[45] Date of Patent: Dec. 22, 1987

[54] GRIPPER ASSEMBLY

[75] Inventors: Thomas E. Arzenti, Munhall; William E. Pirl, Penn Township, Westmoreland County, both of Pa.

[73] Assignee: Westinghouse Electric Corp., Pittsburgh, Pa.

[21] Appl. No.: 5,388

[22] Filed: Jan. 9, 1987

Related U.S. Application Data

[63] Continuation of Ser. No. 785,292, Oct. 7, 1985, abandoned.

[51] Int. Cl.⁴ .............................................. B66C 1/46
[52] U.S. Cl. ................................... 294/119.3; 269/22
[58] Field of Search ................... 294/63.2, 98.1, 119.3; 269/22; 279/2 A, 4; 285/97; 403/5

[56] References Cited

U.S. PATENT DOCUMENTS

| | | | |
|---|---|---|---|
| 2,778,865 | 1/1957 | Kongsgaarden | 269/22 X |
| 2,929,653 | 3/1960 | Hund et al. | 294/119.3 |
| 3,542,354 | 11/1970 | Fitzpatrick | 269/22 |

FOREIGN PATENT DOCUMENTS

| | | | |
|---|---|---|---|
| 658351 | 2/1963 | Canada | 294/119.3 |
| 2458567 | 7/1975 | Fed. Rep. of Germany | 294/119.3 |
| 2845094 | 5/1980 | Fed. Rep. of Germany | 294/98.1 |
| 203864 | 11/1983 | German Democratic Rep. | 269/22 |

Primary Examiner—Johnny D. Cherry

[57] ABSTRACT

A gripper assembly whose gripping member is a thin (0.050″ to 0.060″) pliable elastometer, typically of a Pelethane compound having high coefficient of friction with respect to the surface to be gripped. The assembly includes a hollow retainer formed of abutting retainer sections. Internally the sections form a circularly cylindrical surface. The gripping member is circularly cylindrical and is mounted on the retainer so that it extends over the internal cylindrical surface. The ends of the gripping member have rings which are sealed pressure-tight in slots in the end surfaces of the retainer. Within the gripping member there is a cage formed of rods joined by rings for centering an object to be gripped by windows and defined between the rods and rings of the cage. The retainer has a port through which a fluid (air) under pressure is injected. The retainer has a slot connected to the port so that the fluid is distributed over the region between the gripping member and the internal surface of the retainer causing the gripping member to exert pressure on the object to be gripped.

10 Claims, 11 Drawing Figures

GRIPPER ASSEMBLY

This application is a continuation of application Ser. No. 785,292 filed Oct. 7, 1985, now abandoned.

CROSS-REFERENCE TO RELATED APPLICATION

Application Ser. No. 785,291 filed concurrently herewith to Thomas E. Arzenti and William E. Pirl for *Sleeving of Steam Generators* (herein Arzenti) and assigned to Westinghouse Electric Corporation is incorporated in this application by reference.

BACKGROUND OF THE INVENTION

Arzenti deals with the sleeving of corroded or damaged tubes of steam generators of nuclear reactors. The tubes are typically U-shaped and are sealed in a tube sheet. A channel head extends from the periphery of the tube sheet and the damaged tubes are accessible from within the channel head which may be entered through a manway. When a reactor plant is in operation, the channel head conducts the coolant. The environment within the channel head is radioactive and access to the damaged tubes is available only through this radioactive environment. Each damaged tube is sleeved by inserting a sleeving assembly including a sleeve blank mounted on a mandrel into the damaged tube. After the sleeve blank is inserted in the tube the mandrel must be removed. The mandrel varies widely in cross-sectional diameter and in surface contour along its length.

Arzenti discloses a tool and a method for carrying out the sleeving by remote control thus minimizing the exposure of personnel to radioactivity. This tool includes gripper assemblies for holding and advancing the sleeving assembly when the sleeve is being inserted and for holding and retracting the mandrel after the sleeve blank is fully inserted.

In the use of the Arzenti tool and in practicing the method which Arzenti teaches, it is indispensable that the sleeving assembly, and particularly the sleeve blank, be precisely centered coaxially with the tube being sleeved. It is also necessary that the gripper assemblies which deliver the sleeve blank into the tube be capable of exerting the necessary force at the joint between the sleeve blank and the tube to effect the delivery. In other words, the gripper assembly which advances the sleeve blank into the tube must grasp the sleeve blank so firmly that the full advancing force initially exerted on the gripper assembly and through it on the sleeve blank is transferred to the sleeve blank as the force which advances it into the tube. The advancing force should not be dissipated in part in sliding the gripper along the sleeve blank. The diameters of the sleeve blanks which are in use vary over a wide range. The gripper assembly should be compatible with sleeves of different diameters within this range. The gripper assembly should have a gripping mechanism which conforms to the surface of an elongated object whose cross-sectional dimension varies from point to point along its length over a wide range.

It is an object of this invention to provide a gripper assembly which shall meet the above requirements; namely a gripper assembly in whose use the object being gripped shall be precisely centered with respect to the target towards which it is being advanced, which shall grip the object so firmly that the advancing force exerted between the gripper and the object shall be transferred to the object to enable the object to exert whatever force is necessary to enable the object to reach its destination, which shall be capable of gripping objects over a wide range of surface contours or cross-sectional dimensions, which shall have a gripping member capable of conforming to the surface of an object having an irregular surface, and which shall operate rapidly to engage or disengage the surface.

SUMMARY OF THE INVENTION

In accordance with this invention, there is provided a gripper assembly including a retainer or housing of a metal such as aluminum. A gripper member or bladder of pliable resilient thermoelastometer material extends over the internal surface of the retainer. This bladder is sealed pressure tight at its ends to the retainer defining a pressure-tight region between the retainer and the bladder. The retainer has a port through which a fluid is injected into this region causing the bladder to exert pressure on an object to be gripped and held or advanced. For centering purposes a cage is provided within the bladder.

Specifically the container has a circularly cylindrical internal surface and the bladder is a hollow circularly cylinder coaxial with the internal surface. The cage is an open work, typically composed of hardened stainless steel. The cage is formed of rods joined at the ends and in the center by rings. The rods may be regarded as elements of a circular cylinder whose generatrix is parallel to the rings. The cage is coaxial with the bladder and the internal surface of the retainer.

In use of this gripper assembly for sleeving, the cage serves to center the sleeve with respect to the tube being sleeved. The sleeve blank is composed of Inconel alloy and the bladder should be composed of a material having a high coefficient of friction on Inconcel alloy. When fluid is injected into the region between the bladder and the internal surface of the retainer, the bladder extends under pressure through windows in the cage to engage the object being gripped. The frictional force exerted by the bladder on the object is high and as the gripper assembly is moved to advance the object, the assembly does not slip relative to the object. The gripping bladder is pliable and it is capable of being extended substantially under the pressure of the fluid. By applying appropriate pressure, the bladder can be extended to grip objects over a wide range of cross-sectional dimensions. Experience with a gripper assembly according to this invention which has been used has revealed that the bladder can grip firmly a sleeve blank having a diameter approaching one inch and can also be extended to grip a cylindrical object having the diameter of a relatively thin pencil having a diameter of ¼ inch. Because the bladder is pliable, it also conforms under pressure to objects whose external diameters vary widely from point to point along their length.

In practice, the gripper according to this invention is repeatedly, through numerous cycles, pressurized and relaxed. The gripper material must then be such that the gripper retains its elasticity and pliability throughout the repeated cycling and operates rapidly responsive to the commands to be pressurized and relaxed. Typically, the material of the gripper or gripping bladder according to this invention is composed of a Pelethane compound which has a high coefficient of friction on Inconel alloy. Such material may be bought from Upjohn Co. of La Porte, Tex. The material processed from Upjohn is injection-molded to form the gripper.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings in which.

Figure 6:
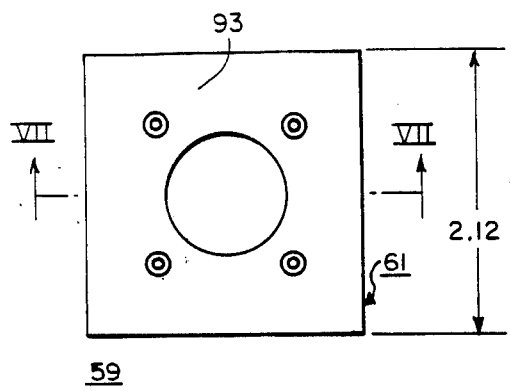
FIG. 6 is a plan view of a modification of this invention.
Figure 9:
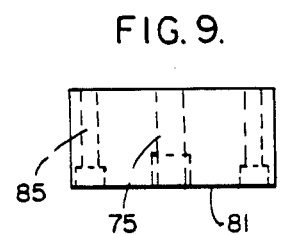
FIG. 9 is a view in end elevation taken in the direction IX of FIG. 8.
Figure 7:
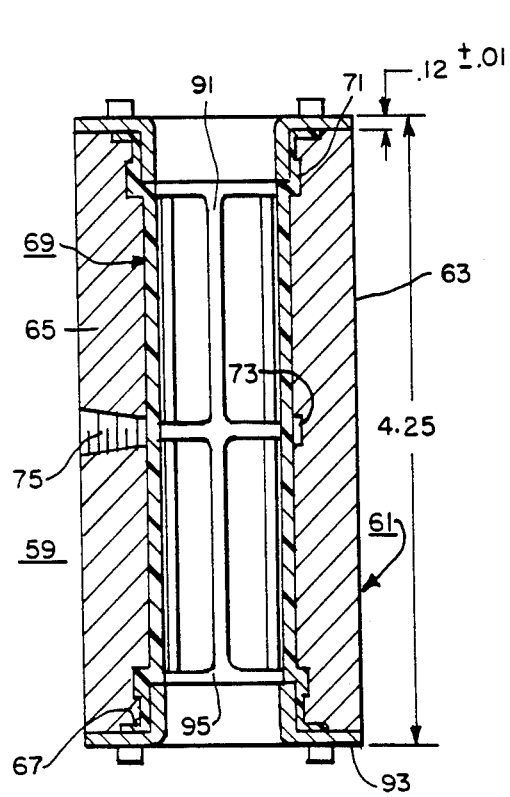
FIG. 7 is a view in section taken along line VII—VII of FIG. 6.
Figure 8:
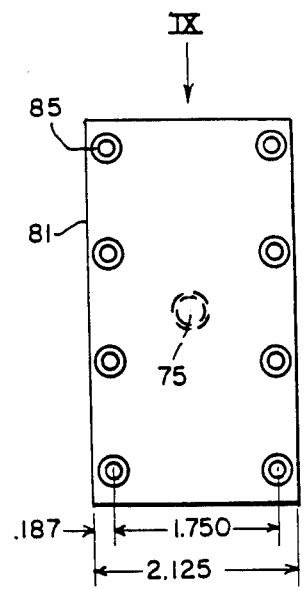
FIG. 8 is a view in side elevation of the block from which a retainer section is formed.

The dimensions shown in FIGS. 6, 7, and 9 and other dimensions presented herein are included for the purpose of aiding those skilled in the art in practicing this invention and not with any intention of any way limiting this invention.

DETAILED DESCRIPTION OF THE PREFERRED EMBODIMENTS

The gripper assembly 10 shown in FIGS. 1–4, includes a retainer or housing 11, a bladder 13 and a cage 15. The retainer 11 is composed of abutting retainer sections 17 and 19 and end caps 21. The caps 21 are of angular longitudinal cross-section. The retainer sections are secured together to form the retainer or housing 11 by bolts 23 through the sides of the caps 21 which engage the end surfaces of the sections 17 and 19. As shown the retainer 11 is a hollow circular cylinder having an internal circularly cylindrical wall. While the circularly cylindrical form has unique advantages in the practice of this invention, other forms or shapes both internally and externally are within the scope of equivalents of this invention. Each retainer section 17 and 19 has slots in its end surfaces 25. The slots in each section are located and dimensioned so that when the sections 17 and 19 are abutted, the slots at each surface 25 are coextensive to form a circular annular slot. The retainer sections 17 and 19 also have grooves near the upper and lower ends and a groove 27 in the center. These grooves are also so dimensioned and located in each section that with the sections abutted, they form circularly annular grooves in the retainer 11. The retainer 19 has a threaded port 29 to receive a connector (not shown) for supplying a fluid; typically compressed air.

The port 29 is in fluid-transfer communication with the groove 27. The retainer sections 17 and 19 are composed of aluminum. Steel inserts (not shown) are provided in the surfaces 25 for threading the bolts 23.

Figure 1:
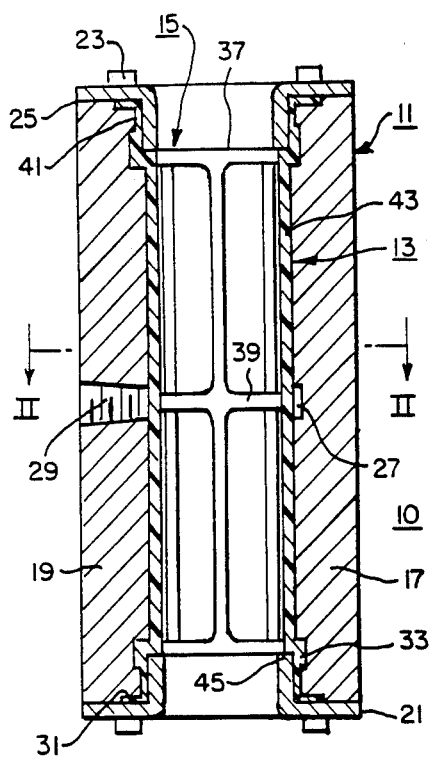
FIG. 1 is a view, in longitudinal section with the cage shown in side elevation, of a gripper assembly according to this invention.
Figure 4:
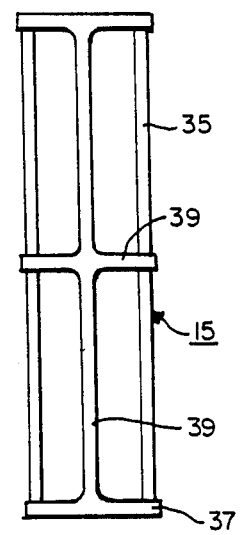
FIG. 4 is a view in side elevation of the cage included in the gripper assembly shown in FIGS. 1, 2, 3.
Figure 2:
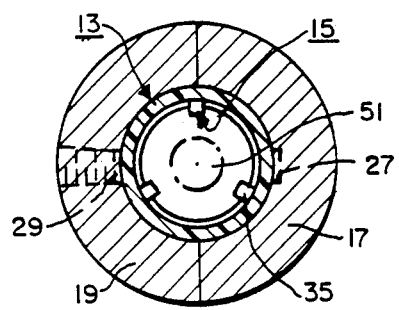
FIG. 2 is a view in transverse section taken along line II—II of FIG. 1 with the bladder shown in the retracted or relaxed state.

The bladder 13 is a circularly cylindrical hollow member of a pliable resilient thermoelastometer. The thickness of the bladder 13 is small, typically about 0.050" to 0.060". Rings 31 extend integrally from the ends of the bladder. The rings 31 are dimensioned to seat in the annular slots in the top and bottom of the retainer or housing as shown in FIG. 1. Near its ends the bladder has external annular projections 33. The projections 33 are located and dimensioned to seat in the annular grooves extending near the ends of the retainer 11 as shown in FIG. 1.

The cage 15 is typically an integral structure including a plurality of rods 35 joined by end rings 37 and a ring 39 in the center. As shown in the drawings, there are three rods 35 uniformly spaced around the rings 37, 39 at 120°. The rings and rods may be regarded as forming a skeleton of a circular cylinder defined by a generatrix parallel to the rods moving over the circle. The cage 15 is composed of hardened stainless steel.

In making the gripper assembly 10, blanks for the retainer sections 17 and 19 are formed from blocks. The blanks are abutted and secured together in a jig or are joined by bolts (not shown) inserted in one section and threaded into the abutting sections. The block assembly is then machined to form a structure whose outer surface is circularly cylindrical and whose inner surface is also circularly cylindrical but with the slots and grooves near the end surfaces and the groove 27 in the center. The port 29 is machined in retainer section 19 in communication with groove 27. The sections 17 and 19 are then separated and the bladder 13 is mounted on the inner walls of the retainers 17 and 19. The rings 31 are seated in the slots 25 in the ends and the projections 33 are seated in the grooves near each end. The surfaces of the rings 31 which seat in the slots and the surfaces which seat in the grooves and the connecting surfaces are coated with a sealing material. The sections 17 and 19 containing the bladder 13 are abutted. The cage 15 is inserted centrally with respect to, and coaxially with, the retainer assembly. Each ring 31 extends from a short annulus 41 (FIG. 1) which in turn extends from a projection 33. Each projection is laterally displaced from the body 43 of the bladder 13 and extends partly above the bladder so that there is a shoulder 45 at the end of the body 43. The cage is mounted with the ends of its rings 37 flush with the shoulder 45. The caps 21 are next mounted on the ends of the assembly with the surfaces of the side which engages the end surfaces of the retainer extending over the rings 31 and the ends of the other sides seated firmly on the shoulders 45 and the adjacent portion of the rings 37. The caps are then tightly bolted to the ends of the retainer 11 so that the rings 31 and projections 33 form pressure-tight seals between the slots and the caps 21.

Figure 3:
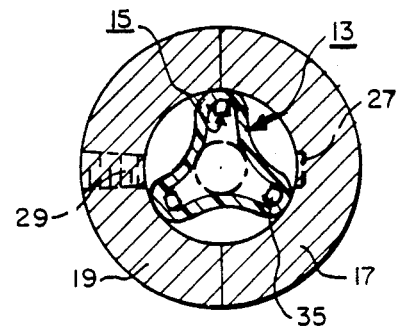
FIG. 3 is a view in transverse section similar to FIG. 2 but showing the bladder extended and in engagement with an object.

In the use of the gripper assembly 10, a body 51 (FIGS. 2, 3) to be gripped is centered in the cage 15. A fluid is then injected into the port 29 and flow through the groove 27 into the region between the body 43 of the bladder 13 and the inner surface of the retainer. The body 43 of the bladder 13 is deflected as shown in FIG. 3 firmly engaging the body 51 to be gripped. The cage 15 determines the pressurized contour of the body 43. Windows are defined between the ring 39, the rings 37 and the rods 35 of the cage 15 and the gripper body 43 expands through these windows when pressurized. The cage shown in the drawing causes the pressurized body contour to consist of two sets of gripping surfaces, one on each side of the central ring 39, the surfaces being spaced by 120° so that the object 51 is uniformly gripped. The engagement of the object 51 in two regions helps align the object. Since the pressure is the same throughout the body 43 and the object 51 is gripped symmetrically with respect to its axis, the gripping forces exerted by the three gripping surfaces are equal and opposite and the object 51 is not displaced in one direction or the other. The cage configuration provides not only gripping forces, but also centering action and lateral stability for the side-to-side loading of an externally gripped body particularly of tubular shape. Because of the pliability and elasticity of the bladder material, the bladder conforms to a non-homogeneous object 51. The projections 33 assure that when the fluid is exhausted the body 43 will, by reason of its resilience, be restored to its original unstressed position.

Figure 5:
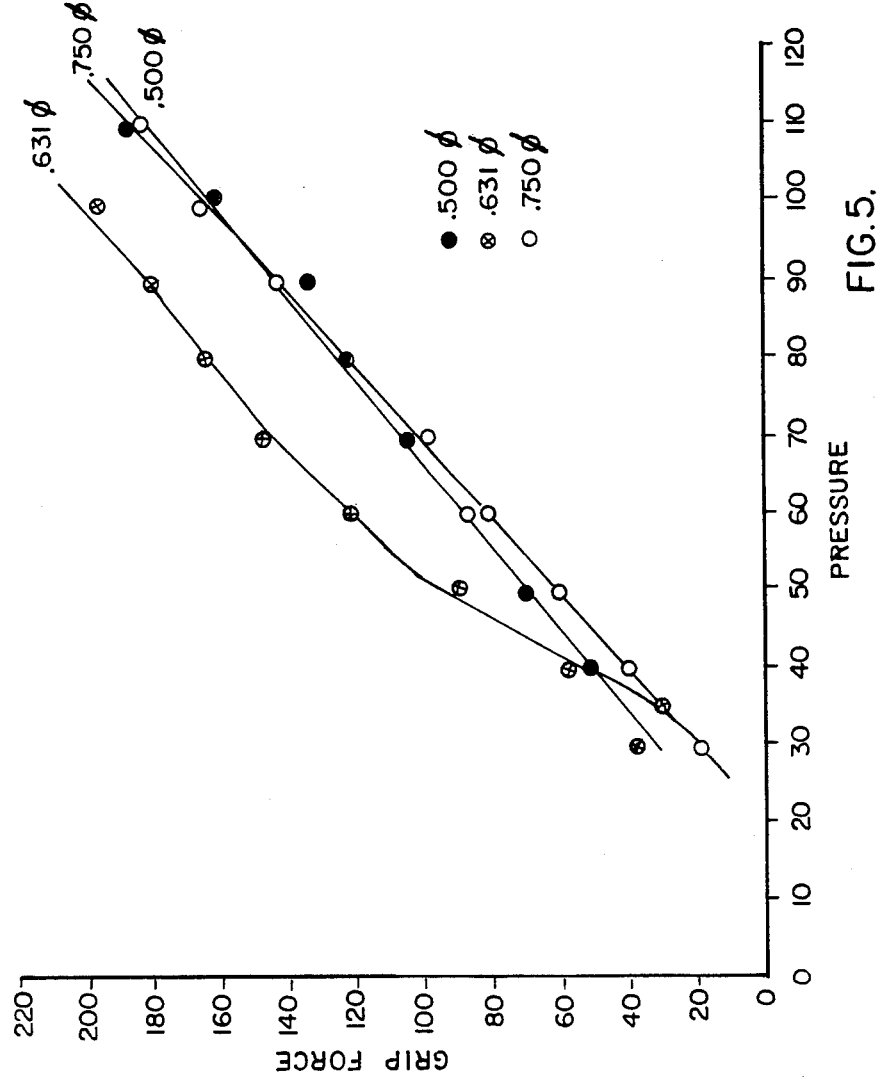
FIG. 5 is a graph showing the grip force exerted by the bladder on an object as a function of the pressure applied to the bladder.

FIG. 5 shows the relationship between the force exerted by the bladder 13 on circularly cylindrical objects 51 of different diameter of specimens of Inconel alloy and the pressure impressed on the bladder. Force in pounds is plotted vertically and pressure in pounds per square inch gage, i.e., above atmospheric pressure horizontally. Curves are plotted for bodies of 0.500" diameter, 0.631" diameter and 0.750" diameter.

In the gripper 59 shown in FIGS. 6–11, the retainer or housing 61 (FIGS. 6, 7) has an external surface of square transverse cross section. The retainer 61 is formed of retainer sections 63 and 65 whose external transverse cross-sections have the form of three sides of a rectangle. Internally the retainer sections 63, 65 are of semicircular transverse cross-section and have the slots in which rings 67 (FIG. 7) of the pliable resilient member, gripper or bladder 69 are seated, the grooves in which the projections 71 of the member 69 are seated and the groove 73. The groove 73, which is in communication with the port 75, is in section 63. In FIG. 7 the port is shown displaced by 90°.

Figure 11:
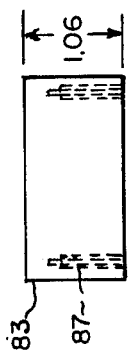
FIG. 11 is a view in end elevation taken in the direction XI of FIG. 10.
Figure 10:
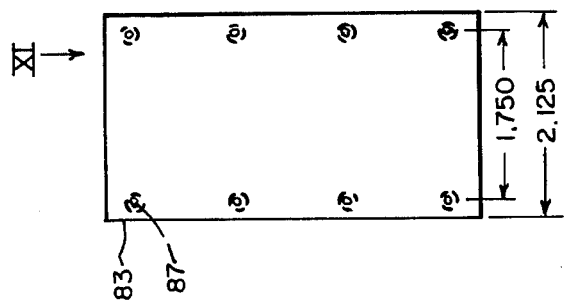
FIG. 10 is a view in side elevation of the block from which the retainer section abutting the section shwown in FIGS. 8 and 9 is formed.

The retainer section 63 is formed from a block 81 (FIGS. 8, 9) and the retainer section 65 is formed from block 83 (FIGS. 10, 11). Blocks 81 and 83 are typically composed of aluminum. The block 81 has bolt holes 85; the block 83 has threaded inserts 87 into which the bolts (not shown) which are inserted in bolt holes 85 are threaded. In making the retainer 59 the blocks 81 and 83 are abutted and bolted together. The circular surfaces with its slots and grooves are machined in this assembly to form the retainer sections 63 and 65. The bolts are then removed and the bladder 69 is positioned in each section. The surfaces of the rings 67 and projections 71 which are to seat in the slots and grooves and the surfaces which join the rings and grooves which are to engage the corresponding surfaces of the retainer sections, are coated with a sealing compound such as "Permatex". The sections 63 and 65 are then bolted together. The cage 91 is then inserted and properly positioned and centered in this last-formed latter assembly and the caps 93 are bolted to the ends of the retainer 61. The inwardly extending rim of each cap engages the corresponding ring 95 of the cage.

While preferred embodiments of this invention have been disclosed herein, many modifications thereof are feasible. For example, while the gripper assembly in accordance with this invention is uniquely suitable for gripping the external surface of an object, it may be applied to grip the inner surface of an object. The application of the principle of this invention to the gripping of the inner surface of an object is within the scope or equivalents of this invention. This invention is not to be restricted except insofar as is necessitated by the spirit of the prior art.

We claim:

1. A gripper assembly for releasably engaging and firmly holding an object, said assembly including a retainer having an opening therein bounded by an inner wall of the retainer, a pliable flexible member extending over the surface of said inner wall, cooperative means near the ends of said flexible member and near the ends of said retainer for mounting said flexible member along substantially the whole length of the inner wall of said retainer to define an expandable pressure-tight volume between said flexible member and said inner wall, an annular groove in the inner wall of said retainer intermediate its said ends in communication with said expandable volume, said groove being interposed between axial sections of said inner wall, and a port in said retainer, directly connected in fluid-transfer communication to said groove, coextensive with a peripheral section of said groove, for injecting through said groove a fluid into said expandable volume between said retainer and flexible member to extend said flexible member to engage said object under the pressure of said fluid, the axial length of said groove being substantially equal to the cross dimension of said port where said port is connected to said groove and said port directing said fluid into said groove whence it is transmitted into said expandable volume.

2. A gripper assembly for releasably engaging and firmly holding an object, said assembly including a retainer having an opening therein bounded by an inner wall of said retainer, said retainer being formed of a plurality of abutting retainer sections, each section having intermediate the ends of said each section a circumferential groove, the inner surfaces of said sections being formed so that with the sections abutted, the inner surface of the retainer is smooth circumferentially, and the grooves in the abutted sections are coextensive to form a conjunct groove extending around the circumference of said inner surface, said conjunct groove being interposed between axial sections of said inner surfaces, a pliable flexible member, cooperative means on said member and on said retainer for mounting said flexible member along the inner wall of said retainer forming a pressure-tight expandable volume between the inner surface of said retainer and said flexible member, and a port in said retainer directly connected to said conjunct groove, for injecting a fluid into said volume between said retainer and flexible member to extend said flexible member to engage said object under the pressure of said fluid, the axial length of said groove being substantially equal to the cross dimension of said port where said port is connected to said groove whereby the fluid from said port flows into said groove whence it is transmitted to said expandable volume.

3. A gripper assembly for releasably engaging and firmly holding a longitudinal object, said assembly including a generally cylindrical retainer having a cylindrical inner wall defining an inner opening, a groove in said inner wall intermediate the ends of said retainer, said groove being interposed between axial sections of said inner wall, a cylindrical pliable flexible member mounted along said inner wall coaxial with said opening, an expandable volume being defined between said flexible member and said inner wall, said flexible member having means, cooperative with said retainer, for sealing said flexible member to said retainer so that said volume between said flexible member and said retainer is pressure tight, said flexible member spanning said groove, a cage mounted within said retainer, coaxial with said retainer, said flexible member being interposed between said cage and said retainer, said cage having an intermediate transverse member disposed radially oppositely to and inwardly of said groove, said intermediate member defining around the periphery of said cage a plurality of aligned sets of axially spaced windows radially opposite said axial sections, and a port in said retainer directly connected to said groove for supplying fluid into said volume between said retainer and said flexible member to actuate said flexible member to engage said object through each said set of windows at aligned axially spaced regions.

4. A gripper assembly for releasably engaging and firmly holding a longitudinal object, said assembly including a generally cylindrical retainer having a cylindrical inner wall defining an inner opening, an annular groove in the inner wall of said retainer intermediate the ends of said retainer, said groove being interposed between axial sections of said inner wall, a cylindrical pliable flexible member mounted along said inner wall coaxial with said opening, an expandable volume being defined between said flexible member and said inner wall, said flexible member having means, cooperative with said retainer, for sealing said flexible member to said retainer so that said volume between said flexible member and said retainer is pressure tight, said flexible member spanning said groove, a cage mounted within said retainer, coaxial with said retainer, said flexible member being interposed between said cage and said retainer, and a port in said retainer, directly connected to said groove, for supplying fluid into said volume between said retainer and flexible member to actuate said flexible member to engage said object, the axial length of said groove being substantially equal to the cross dimension of said port where it is connected to said groove, said cage having windows spaced uniformly by 120° around the circumference of the wall of said retainer, whereby the fluid flowing through said port flows into said volume through said groove and said object is engaged in three uniformly spaced regions around the periphery of said object.

5. The gripper assembly of claim 4 wherein the thickness of the flexible member is small so that said flexible member when engaging an object of irregular surface contour conforms itself to the surface of said object.

6. The gripper assembly of claim 4 wherein the retainer has circumferential slots near its ends and the cooperative means near the ends of the flexible member has rings, the said rings being engaged in said slots, each said ring being sealed to the slot in which it is engaged to provide a pressure tight seal for the volume between said flexible member and retainer wall.

7. A gripper assembly for releasably engaging and firmly holding a longitudinal object, said assembly including a generally cylindrical retainer having a circularly cylindrical inner wall defining an inner opening, a circularly cylindrical pliable flexible member mounted along said inner wall, coaxial with said opening, an expandable volume being defined between said flexible member and said inner wall, said flexible member having means, cooperative with said retainer, for sealing said flexible member to said retainer so that said volume between said flexible member and said retainer is pressure tight, a cage mounted within said retainer, coaxial with said retainer, said cage being formed of a plurality of rods extending axially of said retainer, said rods being joined near the ends of said rods by a plurality of rings, said rods being spaced circumferentially by 120° whereby said cage has windows bounded by said rods and rings spaced by 120° around the circumference of the wall of said retainer, said flexible member being interposed between said cage and said retainer, and means, connected to said retainer, for supplying fluid into said volume between said retainer and flexible member to actuate said flexible member to engage said object, whereby said object is engaged through said windows in three uniformly-spaced regions around the periphery of said object.

8. A gripper assembly for releasably engaging and firmly holding a longitudinal object, said assembly including a generally cylindrical retainer having a circularly cylindrical inner wall defining an inner opening, a circularly cylindrical pliable flexible member mounted along said inner wall, coaxial with said opening, an expandable volume being defined between said flexible member and said inner wall, said flexible member having means, cooperative with said retainer, for sealing said flexible member to said retainer so that said volume between said flexible member and said retainer is pressure tight, a cage mounted within said retainer, coaxial with said retainer, said cage being formed of a plurality of rods extending axially of said retainer, said rods being joined near the ends and center of said rods by a plurality of rings, said rods being spaced circumferentially by 120° so that said cage has three sets each of axially spaced coextensive windows bounded by said rods and rings spaced by 120° around the circumference of the inner wall of said retainer, said flexible member being interposed between said cage and said retainer, and means, connected to said retainer, for supplying fluid into said volume between said retainer and flexible member to actuate said flexible member to engage said object, whereby said object is engaged through said windows in three axially spaced sets of uniformly-spaced regions around the periphery of said object.

9. A gripper assembly for releasably engaging and firmly holding a longitudinal object, said assembly including a generally cylindrical retainer having a cylindrical inner wall defining an inner opening, an annular groove in the inner wall of said retainer intermediate the ends of said retainer, said groove being interposed between axial sections of said inner wall, a cylindrical pliable flexible member mounted along said inner wall coaxial with said opening, an expandable volume being defined between said flexible member and said inner wall, said flexible member having means, cooperative with said retainer, for sealing said flexible member to said retainer so that said volume between said flexible member and said retainer is pressure tight, said flexible member spanning said groove, a cage mounted within said retainer, coaxial with said retainer, said flexible member being interposed between said cage and said retainer, a port in said retainer, directly connected to said groove, for supplying fluid into said volume between said retainer and flexible member to actuate said flexible member to engage said object, said cage having an intermediate ring so that said cage has three sets of axially spaced coextensive windows spaced circumferentially by 120°, whereby said object is engaged through each set of coextensive windows in three uniformly spaced sets of axially spaced regions around the periphery of said object.

10. The gripper assembly of claim 9 wherein the annular groove in the retainer is substantially at the same axial position as the intermediate ring so that the flexible member is actuated to engage the object through the axially spaced windows on each side of the intermediate ring oppositely to the axial sections of the wall of the retainer between which said groove is interposed.

* * * * *